Dec. 16, 1930.  T. J. TELLEFSEN  1,785,604
MEANS FOR ELEVATING PULVERULENT MATERIALS
Filed March 9, 1928  2 Sheets-Sheet 1

Dec. 16, 1930.                T. J. TELLEFSEN                1,785,604
                  MEANS FOR ELEVATING PULVERULENT MATERIALS
                     Filed March 9, 1928        2 Sheets-Sheet 2
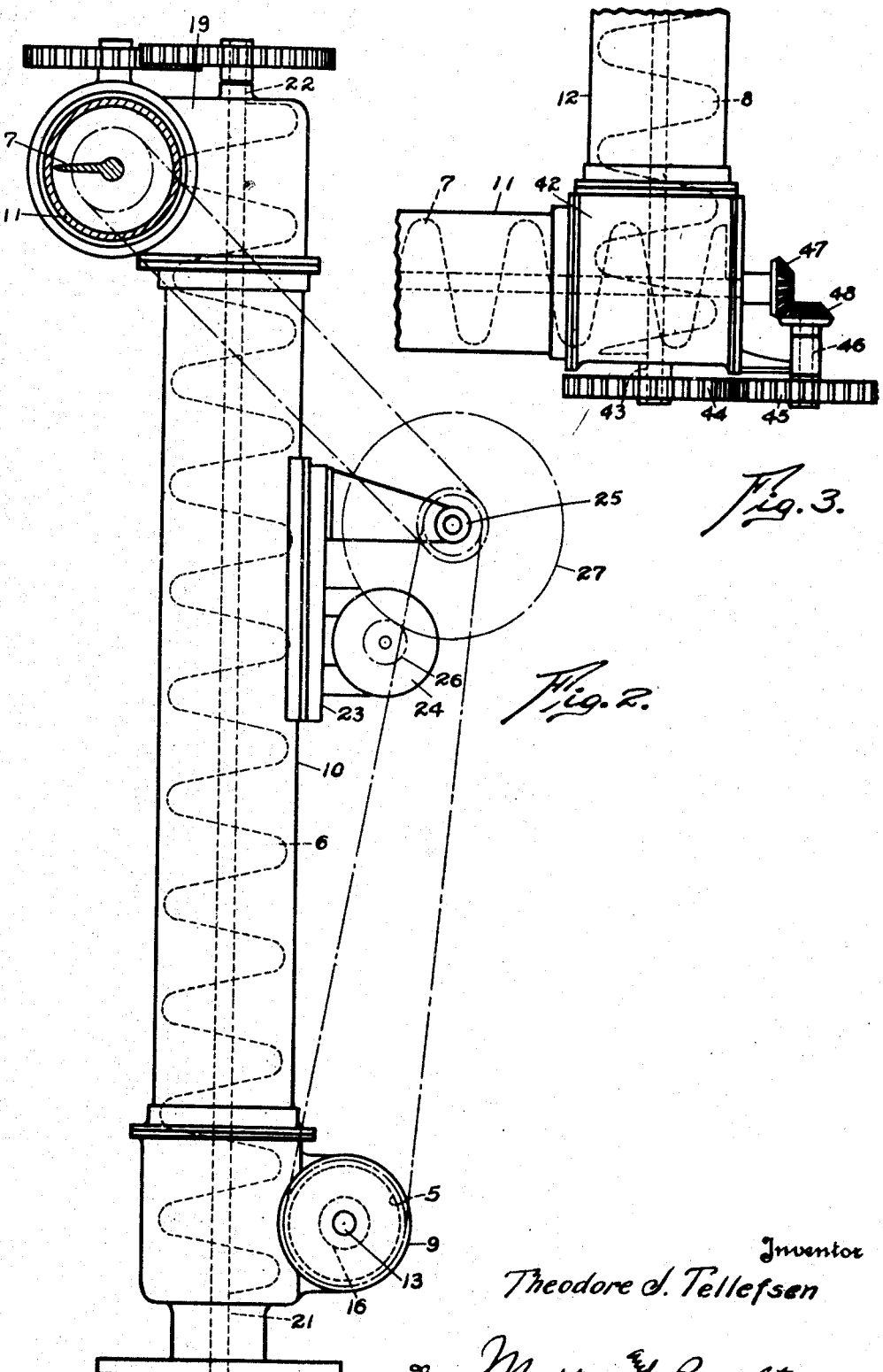

Patented Dec. 16, 1930

1,785,604

UNITED STATES PATENT OFFICE

THEODORE J. TELLEFSEN, OF CINCINNATI, OHIO, ASSIGNOR TO THE J. H. DAY COMPANY, OF CINCINNATI, OHIO, A CORPORATION OF OHIO

MEANS FOR ELEVATING PULVERULENT MATERIALS

Application filed March 9, 1928. Serial No. 260,426.

This invention relates to screw type elevators for conveying finely divided materials such as flour, powders, and the like.

An object of the invention is to provide a screw type elevator which will elevate pulverulent materials in an effective manner.

Another object is to provide a device of this type which is so constructed that the flour or powdered material being elevated is precluded from objectionable packing about the lifting and conveyor screws.

Another object is to provide a device for the purposes stated which is simple of construction and operation.

These and other objects are attained by the means described herein and disclosed in the accompanying drawings, in which:

Fig. 2 is a cross sectional view on line 2—2 of Fig. 1.

Fig. 3 is a view showing means whereby the material being elevated or conveyed may be projected to elevations exceeding that indicated in Fig. 1.

Figure 1:
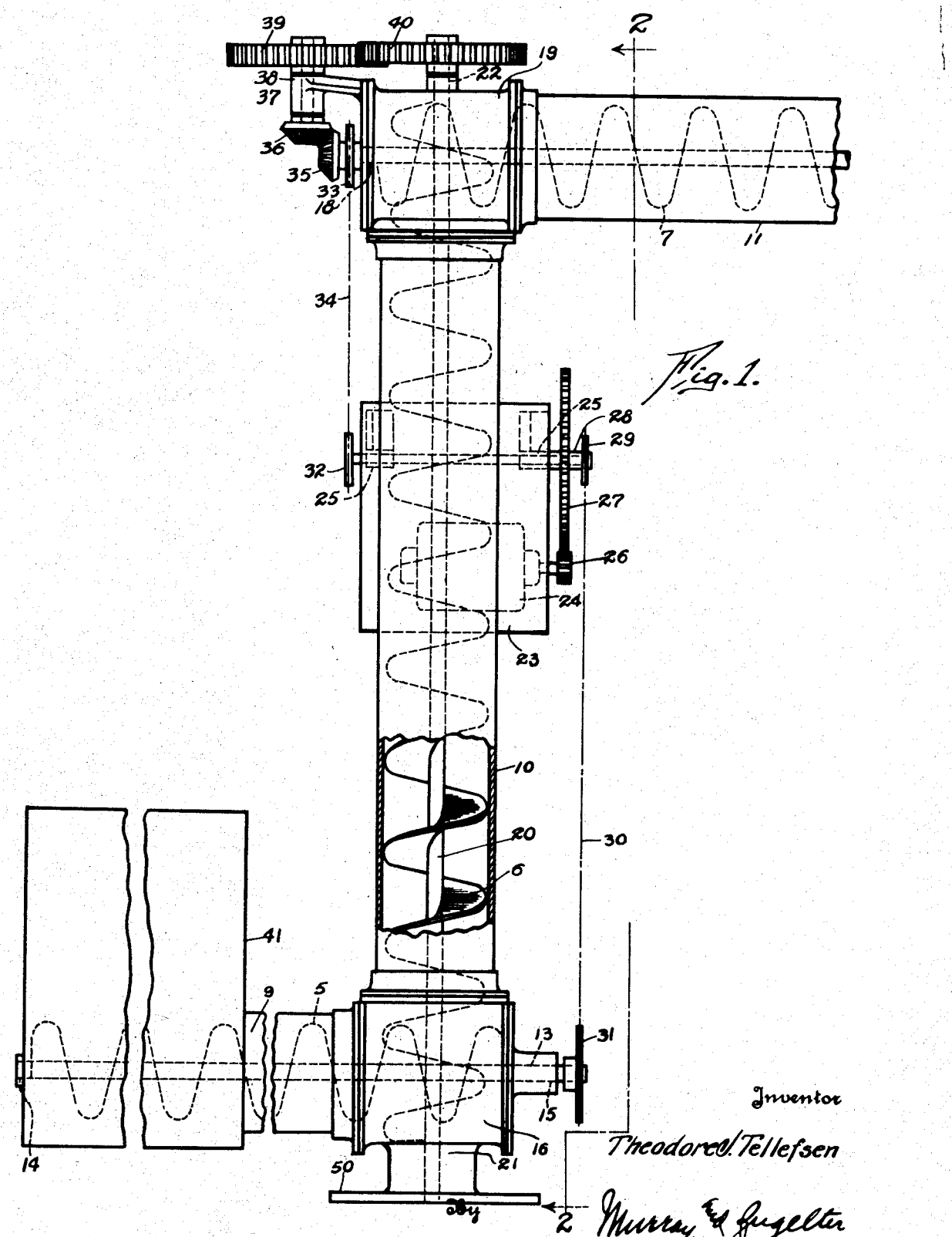
Fig. 1 is a side elevational view of the device, parts being broken away.

In screw type elevating devices heretofore used for conveying and elevating substances and materials such as flour and powders, etc., it has been found that after the material has been elevated to a certain height, packing of the material about the elevating screw takes place, thereby precluding further upward projection of the material. By utilizing the means illustrated in the drawing and described in the specification following, such packing of the material is precluded. Other advantages also will be made apparent in the description.

The device comprises spiral screws 5, 6, 7, and 8 rotatably supported in tubular housings 9, 10, 11 and 12, respectively. Screws 6 and 8 may be termed elevating screws, and screws 5, and 7, lead or feed screws. Feed screw 5 is provided with a shaft 13 suitably journaled in bearings 14 and 15 of a hopper 41 and lower casing 16, respectively. Feed or lead screw 7 is likewise mounted in a bearing 18 in a discharge casing 19 at the upper end of the elevating screw. Elevating screw 6 is provided with a shaft 20 the ends of which are mounted in bearings 21 and 22 provided on the lower casing 16 and discharge casing 19, respectively. As shown in Fig. 2 the tubular members 9 and 11 are positioned in offset relation to tubular member 10.

Suitably supported upon the member 10 is a board 23 which carries a motor 24 and a pair of bearings 25. Motor 24 is provided on its drive shaft with a gear 26 which meshes with a large gear 27 mounted on a shaft 28 rotatably supported in bearings 25. On one end of the shaft 28 is fixedly mounted a sprocket 29 over which a chain 30 passes for driving a sprocket 31 fixedly secured on shaft 15 of screw 5. On the opposite end of shaft 28 is fixedly secured a sprocket 32 which drives a sprocket 33 on the shaft of lead screw 7 by means of a second chain 34. The shaft of screw 7 is also provided with a bevel gear 35, keyed or otherwise fixedly mounted thereon. Said bevel gear is adapted to engage a second bevel gear 36 mounted on a shaft 37 which is suitably journaled in a bearing 38 extending from the discharge casing 19. The opposite end of shaft 37 has fixedly mounted thereon a spur gear 39 which engages a spur gear 40 fixedly mounted on the shaft of elevating screw 6. The means just described imparts rotatory motion to the elevating screw 6 and lead screw 7. It should be noted that the gears and sprockets are of such size as to drive the screw 7 at a speed greater than that of the elevating screw 6. The reason for thus gearing the said screws will be described later.

By providing sprockets 29 and 31 of a proper size, the feed screw 5 may be driven at a greater speed than the elevating screw. Screw 5 has one end thereof extending into a hopper 41 into which material may be fed during the operation of the device. It should be noted that the offset relationship of screws 5 and 7 to the elevating screw 6 is such that the lead screws rotate in close proximity with the blade of the elevating screw. If desired, the tubular member 11 shown in Fig. 1 may terminate at a bin or other suitable container, not shown.

In Fig. 3 the tubular member 11 is exemplified as terminating in an angular housing 42 provided with means whereby a tubular member 12, supporting elevating screw 8, may be placed in offset relation with screw 7. This construction is similar to that shown at the upper end of the device disclosed in Fig. 2.

Means is provided for imparting rotatory motion to shaft 43 of screw 8. Said means comprises a spur gear 44 fixedly secured upon the lower end of shaft 43, said gear being driven by a gear 45 receiving rotatory motion through the agency of a shaft 46 and a pair of co-operating bevel gears 47 and 48. Bevel gear 47 is fixedly mounted on the shaft of the driven screw 7. The ratio of gears 44 and 45 is such as to drive the elevating screw 8 at a speed slower than that of screw 7. The means just described provide for rotation of the elevating screw 8 whereby substance being conveyed may be elevated to a height considerably greater than may be attained by a continuous screw 6. It has been found that a single elevating screw is capable of elevating substance such as flour or powdered material to a certain height. When it is attempted to elevate a substance beyond this point, the substance becomes packed about the elevating screw with the result that the substance rotates with the screw and is not ejected at the top of the screw housing.

The operation of the device is as follows. It is assumed that the screws are of equal pitch and diameter. Flour or other substance is fed to the hopper 41 after the device is set in operation. Lead screw 5, rotating at a comparatively high rate of speed, conveys the substance to the lower end of elevating screw 6 in quantities in excess of the normal carrying capacity of the elevating screw. The substance thus fed to the elevating screw 6 is easily picked up by the elevating screw and elevated to the uppermost point thereof, whence it is quickly removed by the comparatively high speed screw 7 and deposited in housing 42 at a rate in excess of the normal carrying capacity of elevating screw 8. Screw 8, rotating at a speed slower than that of screw 7 thereupon picks up the substance from housing 42 and elevates it to a greater height. It is obvious that by providing additional lead screws 7 and elevating screws 8, the substance may be elevated indefinitely.

In the foregoing paragraph, reference is made to elevating and lead screws driven at different speeds. It is possible of course to obtain the effect of said difference of screw speeds by rotating said screws at equal speeds, provided that either the pitches or the diameters of the screws be unequal. In other words, the efficiency of the device depends to some extent on providing screws of different carrying capacities.

It has been found also that by varying the pitch, speed, or size of the screw elements, finely divided chemicals and metallic oxides of various specific gravities may be elevated to great heights.

It is to be understood that various modifications may be made in the structural details of the device without departing from the spirit of the invention.

What is claimed is:

1. In an elevating device for powdered substances the combination of an upright housing having upper and lower ports, an elevating screw rotatable in the upright housing and extending beyond said ports, a tubular second screw housing having a port in communication with the lower port of the first housing, a feed screw in the second housing for feeding powdered substance to the lower portion of the elevating screw, the screws being disposed transversely of one another in different planes with their peripheries in close proximity.

2. In an elevating device for powdered substances the combination of an upright housing having upper and lower ports, an elevating screw rotatable in the upright housing and extending beyond said ports, a tubular second screw housing having a port in communication with the lower port of the first housing, a feed screw of higher capacity than the elevating screw rotatable in the second housing for feeding powdered substance to the lower portion of the elevating screw, the screws being disposed transversely of one another in different planes with their peripheries in close proximity.

3. In a device of the class described the combination of an upright housing having upper and lower ports, an elevating screw rotatable in the upright housing and extending beyond said ports, a casing at the lower end of the elevating screw housing into which the lower extending portion of the elevating screw is received, a tubular housing disposed angularly to the upright housing and having communication with the said casing, a closely fitting lead screw in the second housing, said lead screw extending beyond the housing, with the periphery thereof closely adjacent the periphery of the elevating screw, and means for rotating the screws at different speeds.

4. In a device of the class described the combination of an upright housing having upper and lower ports, an elevating screw rotatable in the upright housing and extending beyond said ports, a casing at the lower end of the elevating screw housing into which the lower extending portion of the elevating screw is received, a tubular lead screw housing disposed angularly to the upright housing and having communication with the said casing, a closely fitting lead screw in the second housing, said lead screw extending beyond the housing into the casing, the longitudinal axes of the lead screw and elevating screw being disposed in different planes, and power means for rotating the screws.

5. In a device of the class described the combination of an upright tubular housing a casing on each end of the housing, said casings being provided with ports the axes of which are disposed transversely of the axis of the tubular housing and spaced therefrom, an elevating screw in the said housing, the screw having vaned ends extending into the casing on the ends of the housing, a lead screw housing communicating with the port of the lower casing, a rotatable lead screw closely fitting within said housing, the periphery of the lead screw being disposed closely adjacent the vanes of the elevating screw, and a conveyor screw and cooperative housing communicating with the port of the upper casing for conveying material lifted by the elevating screw.

In testimony whereof, I have hereunto subscribed my name this 28th day of February, 1928.

THEODORE J. TELLEFSEN.